United States Patent [19]

Katz

[11] Patent Number: 5,412,708
[45] Date of Patent: May 2, 1995

[54] VIDEOPHONE SYSTEM FOR SCRUTINY MONITORING WITH COMPUTER CONTROL

[76] Inventor: Ronald A. Katz, 570 S. Mapleton Dr., Los Angeles, Calif. 90024

[21] Appl. No.: 31,235

[22] Filed: Mar. 12, 1993

[51] Int. Cl.$^6$ .............. H04M 11/00; H04N 7/14
[52] U.S. Cl. ............................ 348/14; 348/16; 379/102; 379/104
[58] Field of Search ............ 379/53, 54, 40, 38, 379/39, 42, 43, 44, 45, 49, 102, 104, 105, 92, 96, 93, 94, 142, 205, 202, 203, 204; 358/85; 348/14, 15, 16, 13

[56] References Cited

U.S. PATENT DOCUMENTS

| | | | |
|---|---|---|---|
| 3,881,060 | 4/1975 | Connell et al. | |
| 4,493,948 | 1/1985 | Sues et al. | |
| 4,641,127 | 2/1987 | Hogan et al. | |
| 4,825,457 | 4/1989 | Lebowitz | 379/40 |
| 4,843,377 | 6/1989 | Fuller et al. | |
| 4,893,325 | 1/1990 | Pankonen et al. | 379/142 |
| 4,939,773 | 7/1990 | Katz | 379/205 |
| 4,954,886 | 9/1990 | Elberbaum | 379/102 |
| 4,962,473 | 10/1990 | Crain | |
| 5,061,916 | 10/1991 | French et al. | 379/106 |
| 5,077,788 | 12/1991 | Cook et al. | 379/45 |
| 5,109,399 | 4/1992 | Thompson | 379/45 |
| 5,164,979 | 11/1992 | Choi | 379/40 |
| 5,202,759 | 4/1993 | Laycock | |
| 5,241,587 | 8/1993 | Horton et al. | 379/92 |

FOREIGN PATENT DOCUMENTS

| | | | |
|---|---|---|---|
| 188286 | 7/1986 | European Pat. Off. | |
| 63-260536 | 4/1990 | Japan | |
| 0029456 | 2/1991 | Japan | 379/53 |

OTHER PUBLICATIONS

Rangan, P. Venkat, "Video conferencing, file storage, and management in multimedia computer systems", *Computer Networks and ISDN Systems*, Mar. 1993, vol. 25, No. 8, pp. 901–919 (Article).

Imai, R., et al., "Multimedia Communication Technology", *Fujitsu Scientific & Technical Journal*, 1992, vol. 28, No. 2, pp. 172–179–(Article).

Yager, T., "Better Than Being There", *Byte*, Mar. 1993, vol. 18, pp. 129–130, 132–134–(Article).

Articles: Bramley, *Vision by Telephone*, Jan. 1986, Computer Systems, Great Britain.

*Primary Examiner*—Curtis Kuntz
*Assistant Examiner*—Stella L. Woo
*Attorney, Agent, or Firm*—Nilsson, Wurst & Green

[57] ABSTRACT

In conjunction with the dial-up public telephone system, voice quality lines carry videophone signals for monitoring a multitude of security locations from a central station. At the central station, telephonic interface apparatus is actuated by a control unit to selectively accomplish a telephonic connection with a remote location. Displays include the scene at the security location and related graphic data. During routine operation, security locations are displayed in sequence. Such operation may be interrupted either from a security location or central station in the event of an urgency. In such an event, the concerned scrutiny location is displayed for further communication involving status, camera selection, camera configuration, audio, video and so on. Incoming calls from scrutiny stations imply an urgent situation for immediate display. The called number, by dialed number identification system (DNIS) may indicate the status while the calling number identifies the location by automatic number identification (ANI) signals. Alternative signalling and code techniques afford flexible operation as with respect to various graphic and status indications available for displays.

22 Claims, 6 Drawing Sheets

VIDEOPHONE SYSTEM FOR SCRUTINY MONITORING WITH COMPUTER CONTROL

FIELD OF THE INVENTION

The present invention relates generally to security systems and more particularly to a videophone system for monitoring remote locations from a central unit.

BACKGROUND OF THE INVENTION

Over the years, a multitude of security systems have been proposed for monitoring various locations that involve some exposure to risk or peril. Generally, the objectives have included discouraging an intruder, notifying security personnel, as police, and providing some form of record of any criminal activity. Various forms of photographic devices have been proposed for use in such systems; however, the advent of television substantially enhanced the possibilities for scrutiny or surveillance of a location. In that regard, large modern office buildings are seldom without an internal closed-circuit system with a guard station displaying several significant locations within the building. Accordingly, a single guard can monitor a sizeable building, summoning help to a problem location. Furthermore, it has been proposed to record monitor displays for subsequent study and analysis in the event of a crisis.

While previous monitoring systems have been effective, particularly in conjunction with a single facility, there have been attendant limitations. For example, simple television displays often do not clearly manifest a potential or existing problem. Also, such systems are not susceptible to programmed operation, enabling an expert to flexibly monitor a sizeable number of individual locations. Furthermore, in accordance herewith, the present invention recognizes the need to expand the capability of monitoring to accommodate security locations over a widely distributed area. As a further consideration, needs also are recognized for increased communication capability, enhanced displays and expanded control of the displays.

SUMMARY OF THE INVENTION

Generally, the system of the present invention involves monitoring and communicating with a plurality of remote locations from a central unit utilizing dial-up telephone facilities, in today's environment with voice quality lines under computer control. Specifically, the dynamic graphics of telephonic video along with audio capabilities are combined with the interactive capability of computers to attain an effective security system.

In the disclosed embodiment of the present invention, videophone cameras and speakerphones are placed at remote locations to provide signals to a central station that may include several communication and control stations. A video scene display may be provided with graphics and audio and data signals at each communication and control station.

In one exemplary operating format, identification designations for scrutiny locations are provided in sequence to address a memory for fetching telephone numbers and graphic display data. Accordingly, in sequence, scrutiny locations are dialed up via the public telephone system to obtain audio-video communication providing an image of the location scene. Additionally, data associated with the location is graphically displayed for convenient reference. It should be noted that response time (i.e., to call the police) is often critical, thus displaying the data in conjunction with the video allows for action to be taken immediately if required, either automatically or manually. Note also that the display also may include, the location and graphical data indicative of the floor plan of the premise scrutinized, for example the physical location of entry/exit points and the corresponding streets provided simultaneously with the video scene images.

The sequence of displays may be random or predetermined, as programmed along with intervals of display. For example, a remote location under scrutiny might be observed for thirty seconds once every ten minutes. For each scene display, a graphic may display pertinent data, for example by a graphic, for example, indicating the telephone number, the location name, e.g. a bank or a market, the address of the location, the telephone number of the police station serving the location, key personnel at the location and so on. The status or nature of the situation, e.g. an emergency or alert, also may be displayed. On command, either from a scrutiny location or the central station, a communication may be commanded to indicate a situation. Special controls may be instituted enabling manifestations at the security location to initiate action or alter the display. Special operations also may be commanded through a videophone, either on manual initiative or automatically by sensor apparatus.

BRIEF DESCRIPTION OF THE DRAWINGS

A complete understanding of the invention and its advantages may be gained from a consideration of the following description of the disclosed embodiment taken in conjunction with the accompanying drawings, in which.

DESCRIPTION OF THE PREFERRED EMBODIMENT

Figure 1:
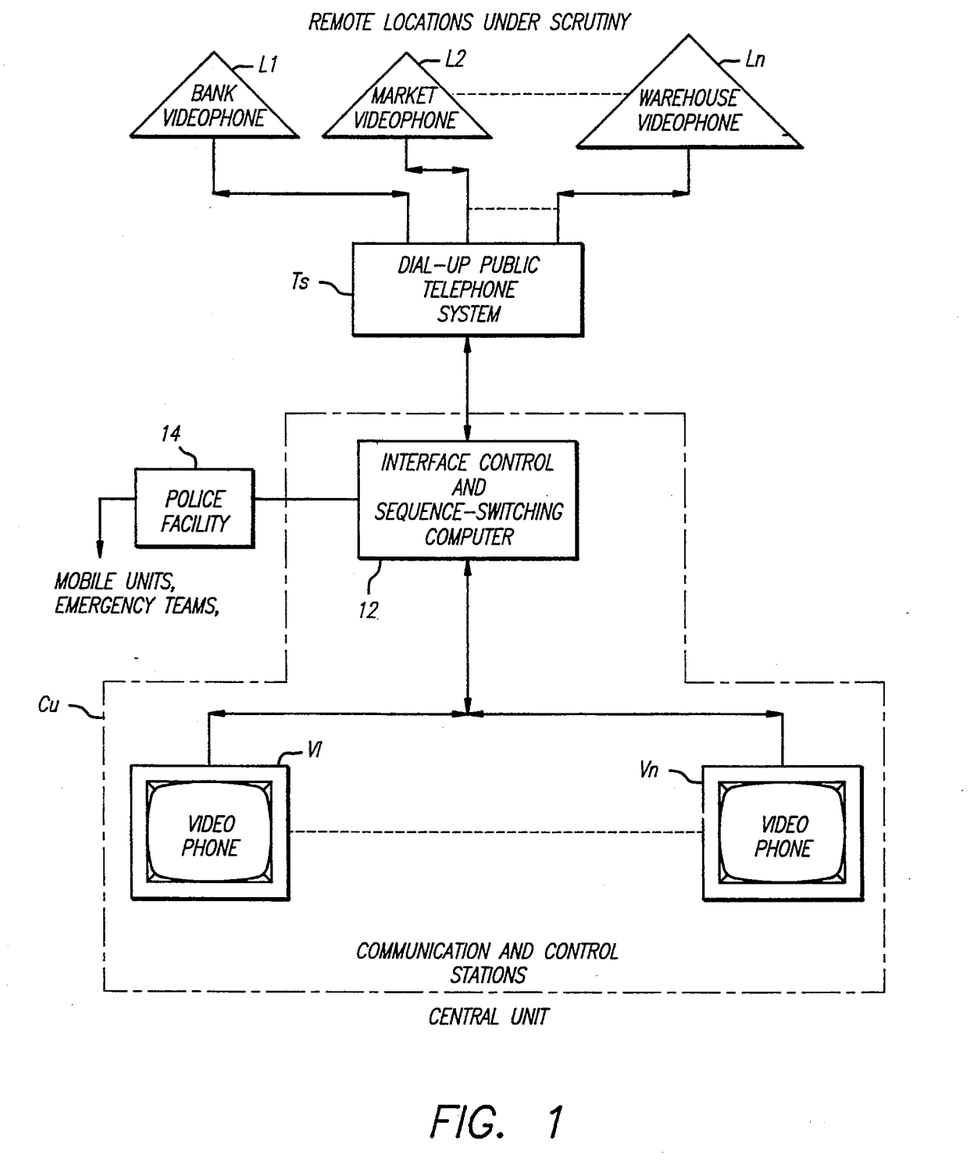
FIG. 1 is a high-level block diagram of a system in accordance with the present invention.

As indicated above, a significant aspect of the system of the present invention is based on recognizing that a dial-up public telephone system may be effectively utilized for scrutiny communication between a plurality of remote security locations and a central station. More specifically, it has been recognized that for an effective security system, dial-up voice quality lines may be employed in conjunction with videophone equipment, computer facilities, sensing apparatus and various forms of telephonic equipment as voice generators, auto dialers and D-channel or in-band signalling apparatus for example. In that regard, a dial-up public telephone system TS is illustrated in FIG. 1 (upper central) affording effective communication between a plurality of remote locations L1–Ln and a central unit CU.

The remote locations L1–Ln may involve a wide variety of scrutiny locations, for example, markets, banks, warehouses, residences, automatic tellers and so on. Essentially, each location L1–Ln is equipped with videophone capability (described below) to provide telephonic signals through the telephone system TS to accomplish a display at the central unit CU. Along with video signal display, under manual or computer control, audio and data signals are employed to supplement and enhance monitoring operations. In that regard, each of the locations L1–Ln may incorporate several video speakerphones, cameras, sensors, switches, automatic dialing devices and computer memory capability for initiating and responding to commands from the central unit CU, as well as initiating various actions to accommodate special circumstances.

The central unit CU incorporates a telephonic interface, control and sequence-switching computer 12 coupled to a plurality of videophone monitor stations V1–Vn. Accordingly, as suggested above, during routine operation, the videophone stations V1–Vn simply provide a sequence of combined audio, scene and graphic displays revealing situations at identified remote locations L1–Ln. In the event of special circumstances manifesting an "alert" or "emergency" situation, for example, one or more of the videophone stations V1–Vn then is dedicated to monitoring and communicating with the location L1–Ln experiencing a special situation.

The videophone terminals may be supplemented, as for an emergency. Specifically, cellular telephone capability may be provided for independent communication. As indicated below, such capability also may be important at locations L1–Ln.

As suggested above, a special situation, (e.g., "emergency" or "alert") is initiated either from the central unit CU or any one of the remote locations L1–Ln. Essentially, in response to a sensed special situation, dial-up operations are initiated to accomplish a "special situation" connection from one or more of the videophone stations V1–Vn so as to monitor and potentially affect the situation at one of the scrutiny locations L1–Ln.

As another consideration, police involvement may be commanded by communication from the computer 12 to a police facility 14 which may in turn afford communication with various police capabilities including mobile units and emergency teams. Alternatively or additionally, under certain conditions, a call is automatically placed to the police facility 14 giving a message in the form of an alarm with data. Specifically for example, under predefined conditions, the control computer 12 actuates an autodialer to dial up the police facility on a specific line. For example, an operator at a terminal might wear an earphone that is coupled to the police call line. Accordingly, on viewing the display, the operator would immediately be in contact with the police and could describe the situation. Note that the involvement of the central unit CU with police alarms can be very effective in relation to false alarms. For example, the police facility 14 might be notified: "no perpetrator is visible but the 'emergency' door is open, we are monitoring."

Preliminarily, considering an exemplary sequence of operations, assume that the location L1, a bank, is entered by a person carrying a gun with an intent to commit robbery. At some point, as described in detail below, the intention of the person may become known and manifest by a command signal, variously generated at the location L1. As result, telephone equipment at the location L1 is actuated, prompting dial-up operations to accomplish a connection from the bank location L1 through the telephone system TS and the computer 12 to one of the videophone stations V1–Vn. Assume for example that the videophone station V1 is involved. As described in detail below, in such a situation, the called number to the computer 12 (originated by the location L1) indicates the nature of the special situation, e.g., "emergency" or "alert". That is, the nature of the situation is indicated by dialed number identification signals (DNIS) as readily available from the telephone system TS, as for example on the so-called D-channel.

While the D-channel provides one operational configuration, some DNIS and/or ANI data signals can be received in-band without D-channel apparatus. In any event, DNIS signals indicate the called number from the bank location L1. With the data (DNIS for situation, ANI for identification) the computer 12 fetches identification data for a graphic display at the videophone station V1. Thus, the videophone station V1 displays a video scene within the bank location L1 along with graphic data, for example, to indicate: the nature of the special situation, e.g. "alert" or "emergency", the location, key personnel and so on.

The emergency display continues with the system implementing manual controls as disclosed in detail below. For example, the status of the situation can be altered, various cameras at the location L1 may be selected, scenes may be modified and audio or video may be controlled. Also, a record is made of all received signals as for subsequent study. Note also that by assigning each of the locations L1–Ln, a distinct DNIS (called number) identification data in the memory can be accessed by the DNIS number if desired.

To consider the operation of the embodiment in somewhat greater detail, reference will now be made to FIG. 2 generally showing a plan view of a portion of the bank location. Specifically, FIG. 2 illustrates a layout of video cameras along with sensors and switches that may be employed to indicate a special situation.

Figure 2:
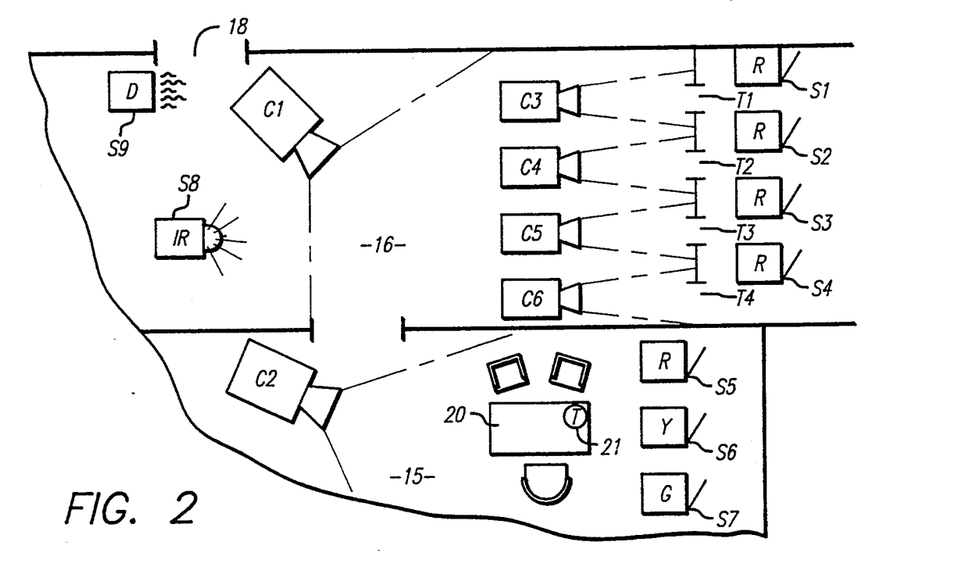
FIG. 2 is a fragmentary diagrammatic plan view of a scrutiny location illustrating sensor and camera locations for an exemplary installation.

Note, with respect to FIG. 2, that the individual cameras and sensors (including manual switches) may take a multitude of forms. For example, the cameras could be wireless, panning, zoom and so on, while the sensors might be sonic, infrared, visible light, metal detectors, and so on.

As another consideration with respect to an individual location or facility, as described in detail below, the active sensors and cameras may be modified in accordance with an operating schedule for the location. For example, when a bank is closed, it may be prudent to eliminate cashier window monitoring and concentrate on access points. In a related context, a location might be selectively monitored, e.g., access points only when the installation is "armed", as when alarms are set.

In FIG. 2, four teller windows T1–T4 are illustrated (right) in a room 16 above a desk area 15 indicated to be partially enclosed. At the other side of the room 16, an entrance 18 is represented. Thus, in a somewhat traditional arrangement, bank customers enter the room 16 through the entrance 18 to transact business either at one of the teller windows T1-T4 or in the area 15.

Of course, the extent of coverage and the position of cameras is expected to vary widely in different installations. However, in the exemplary arrangement of FIG. 1, a camera C1 provides a wide-angle view of the transaction area. A camera C2 covers the area 15 and cameras C3, C4, C5 and C6 are concentrated respectively on the teller windows T1, T2, T3 and T4. The cameras C1–C6 are adjustable and as a consequence may zoom or pan with reference to a subject. Thus, considerable flexibility is afforded in monitoring the room 16. Note that cellular telephone techniques may be employed in relation to the locations L1-Ln, as for example, the camera C1 might be backed up by a cellular phone arrangement to function in the event of a telephone line severance. Battery backup, of course, is contemplated.

Various forms of actuators or sensors may be provided to indicate a special or urgent situation at the bank. For example, as illustrated in FIG. 2, manual silent alarm switches S1–S4 are provided at a convenient location for each of the teller windows T1–T4 respectively. Typically, the switches S1–S4 would be positioned to enable subtle actuation. In FIG. 2, the switches S1–S4 are labelled "R" (red) to indicate an "emergency" situation on actuation. That is, if a teller actuates one of the manual switches, a realistic possibility exists that the teller is being held up and a "red" or "emergency" situation is indicated.

The area 15 containing a desk 20 is provided with three manual switches, S5, S6 and S7, each of a different type. Specifically, the switch S5 indicates an "emergency" or "red" situation, the switch S6 indicates an "alert" or "yellow" situation and the switch S7 indicates a "routine" or "green" situation.

The desk 20 also is equipped with a telephone instrument represented by an encircled letter "T" and designated "21". The telephone 21 is coupled into the system and may be employed to interface the central unit CU (FIG. 1) as described below.

In addition to manual switches, automatic sensors are represented in FIG. 2. Specifically, a switch S8 comprises an infrared sensor for detecting motion. Of course, various forms of sensors and various operating philosophies may be implemented. For example, in the arrangement of FIG. 2, the absence of motion (routine business) within the room 16 actuates the sensor switch 18 to indicate an alert situation. Alternatively, motion in certain areas, at certain times may indicate an emergency.

Switch S9 is embodied as a doorway metal detector. Accordingly, passage through the entrance 18 by a person bearing a weapon actuates the switch S9 to command an "alert" or "yellow" situation. As indicated, commanding any situation actuates the system to establish communication from the bank location L1 to the central unit CU to initiate monitoring, recording and selective involvement.

To consider the system of the disclosed embodiment in somewhat greater detail, reference will now be made to FIG. 3 in which previously identified components bear similar reference numbers. Accordingly, the dial-up telephone system (center) is designated TS, scrutiny locations (right) are designated L1-Ln and the central unit (left) is designated CU.

Recapitulating to some extent, the dial-up telephone system TS accomplishes communication between the central unit CU and the individual scrutiny locations L1-Ln. The communication may be initiated either by the central unit CU or any one of the scrutiny locations L1-Ln. Typically, during intervals of routine operation, the central unit CU initiates contact with the scrutiny locations L1-Ln in sequence (either predetermined or random) to afford momentary viewing of scrutiny locations. However, it should be noted that continuing scrutiny, i.e., clocked scrutiny for an entire eight hour shift is also likely for certain various high risk locations.

Upon the occurrence of a condition at one of the scrutiny locations L1-Ln suggesting or indicating a special situation, or merely as a check, a command signal may be initiated either manually or automatically to accomplish the communication. Such a command signal indicates either a "routine" situation (green), an "alert" situation (yellow) or an "emergency" situation (red).

Figure 3:
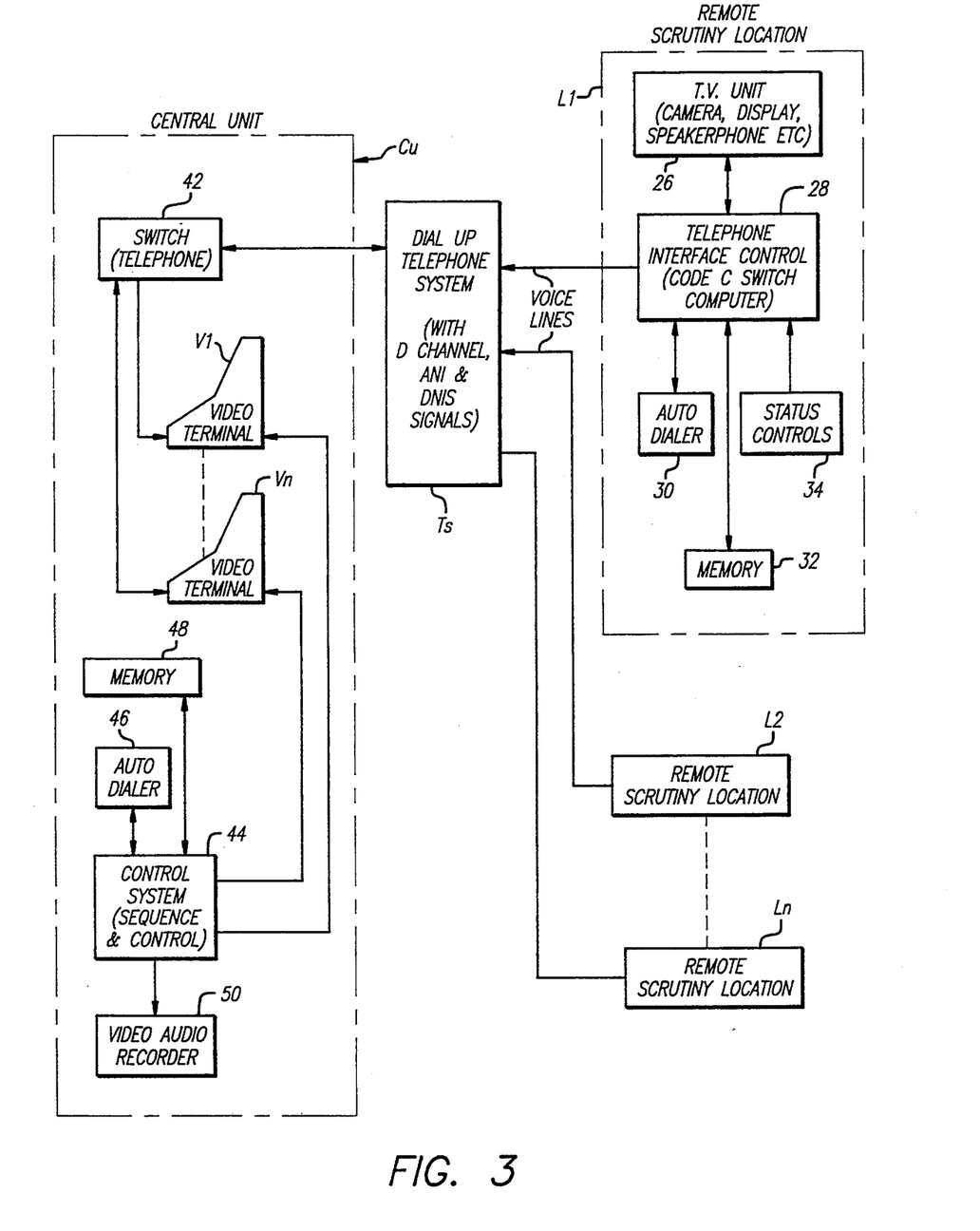
FIG. 3 is a more detailed block diagram of basic components in an exemplary system of the present invention.

Only one of the scrutiny location structures L1-Ln is disclosed in detail in FIG. 3. Specifically, in the scrutiny location L1, at least one television unit 26 is provided for producing a television signal representing both video and audio. That is, as illustrated in FIG. 2, several separate television units may be provided to cover different areas of a scrutiny location or provide different aspects. Each unit 26 includes the elements of a videophone, e.g. camera, display, speakerphone, etc., along with control capability as disclosed below. Audio and video signals from the television unit 26 (along with any duplicate units) are provided to a telephone interface control unit 28 incorporating a videophone encoder-decoder (CODEC) chip set, a telephone switch and a control computer. A form of the interface unit 28 is treated in detail below. However, the unit has the capability to accommodate videophone operation along with telephone switching and a variety of control functions.

The interface unit 28 is also connected to an auto dialer 30, a memory 32 and a status controls 34. These structures also are disclosed in somewhat greater detail below; however, the auto dialer 30 may take any well known form of such units as may the memory 32. The status controls 34 may take a multitude of different forms as considered to some extent with reference to FIG. 2. That is, the status controls 34 may include manual switches, photoelectric sensors, infrared sensors, visible light sensors, metal detectors and even threshold sonic detectors. For example, a sonic detector might signal a gunshot to command an emergency status.

To consider the operation sequence within the location L1, upon the actuation of one of the status controls 34 (special situation signal), the unit 28 fetches two distinct telephone numbers, i.e., a called number and a calling number. The called number comprises one of the numbers for establishing communication with the central unit CU. Of several such numbers, each indicates an individual status. For example, called numbers for the central unit CU might be assigned as indicated by the following chart:

CHART I
Remote Location Calls

| Called No. | Status | Time |
| --- | --- | --- |
| 555-1111 | Routine (G) | Preset |
| 555-2222 | Alert (Y) | Hold-Manual Control |
| 555-3333 | Emergency (R) | Hold-Manual Control |

Thus, the unit 28, by selecting a calling number for the central unit CU, indicates status at the central unit. Accordingly, if a status control 34 at the scrutiny location L1 detects an emergency situation, the unit 28 commands the memory 32 (look-up table) to provide a telephone number "555-3333" for actuating the auto dialer 30 to produce dial signals (through unit 28) to the dial-up telephone system TS. Accordingly, connection is established with the central unit CU indicating an "emergency" status, i.e. "condition red". The "emergency" signal would be indicated at the central unit CU by Direct Number Identification Signals (DNIS) utilizing facilities readily available and provided by the dial-up telephone system TS through the so-called D-channel.

The dial-up telephone system TS also provides Automatic Number Identification (ANI) signals indicating the calling number on the so-called D-channel. In the disclosed embodiment, such signals identify the location of the remote scrutiny station L1 to the central unit CU. Note, that the memory 32 may provide alternate forms of calling signals commanding a specific outgoing line from the telephone interface and control unit 28 to afford additional communication. For example, ANI signals alternately might command status, other situations or related data.

Upon attaining communication with the central unit CU, the remote scrutiny location L1 is in videophone communication with the central unit CU. Specifically, the television unit 26 provides videophone signals through the unit 28 and the dial-up telephone system TS to the central unit CU to manifest the current circumstances in the form of a scene and graphics.

Summarizing to some extent, upon the actuation of a command signal at a scrutiny location, e.g. scrutiny location L1, a connection is established from the scrutiny location L1 to the central unit CU through the telephone system TS. Additionally, signals are provided (ANI and DNIS) at the central unit CU to indicate the specific identification of the scrutiny location L1 and the status affording the basis for the call.

As another aspect hereof, the system may test conditions at a location prior to, or as part of providing a display. Human involvement may accordingly be reduced. For example a video picture can be digitized and recorded to provide a video recording that indicates a scene at a specific instance of time. If that scene does not change, to some extent, the assumption is that it is secure. Accordingly, after the time of recording the scene, another video picture is provided, digitized and compared with the first picture. Unless the change amounts to a predetermined percentage or part of the total picture, the location is assumed to be secure. As an example, a closed vault door may be the subject of the picture. If it is opened on a subsequent check to indicate a substantial change in the picture, an emergency is indicated and the system should be activated to provide a display.

Within the central unit CU, a telephone switch 42 accommodates both incoming and outgoing traffic serving a plurality of video display stations or terminals V1–Vn. Each of the terminals V1–Vn incorporates the capability of a videophone (CODEC chip set, display, camera, speakerphone, keypad, control, etc.) along with additional control functions as described below. In that regard, the display terminals V1–Vn may incorporate relatively large monitors and a variety of other enhanced apparatus for more effective prolonged human use.

Each of the video terminals V1–Vn are connected to a control system 44 that is in turn connected to an auto dialer 46, a memory 48 and a video audio recorder 50 (video and audio capability). Essentially, these units are time shared by the video terminals V1–Vn. In that regard, capability may be provided in the control system 44 to transfer connections to locations L1–Ln as between the terminals V1–Vn. For example, in that regard, operators at the terminals V1–Vn may be specialists for various conditions with designated calls routed to specific terminals and transfer capability to accommodate changes in situations.

Figure 4:
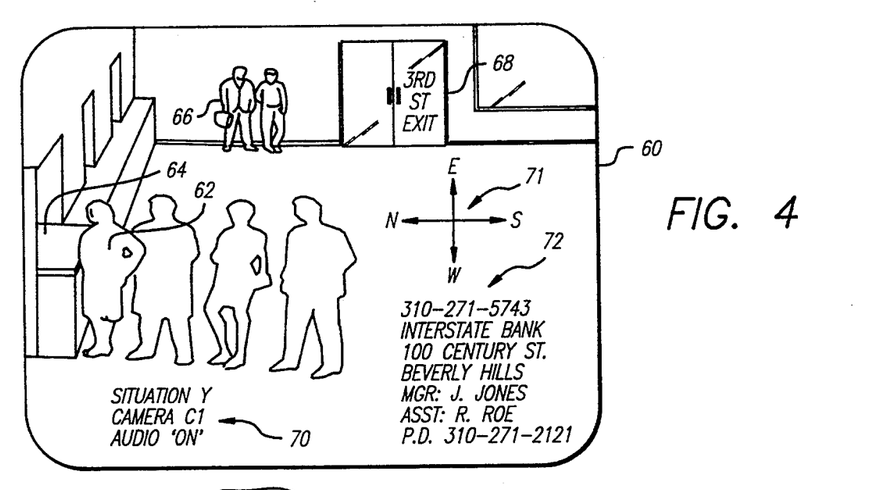
FIG. 4 is a graphic representation of a display of the system of FIG. 3.

Recapitulating, as explained above, the central unit CU functions both to initiate outgoing calls and receive incoming calls for flexibly monitoring the remote scrutiny locations L1–Ln. To continue with the explanation of an incoming call, when the switch 42 in the central unit CU receives an incoming call, it will be connected to one of the video terminals V1–Vn. Concurrently, incoming data signals (DNIS and ANI) are passed to the control system 44. From the memory 48, the system 44 fetches the identification of the location L1 and the designated status, e.g., "emergency" "alert" or "routine" With such signal represented data, the control system 44 may select a specific one of the terminals, e.g. terminal V1, to handle the call. The control system 44 then provides computer graphic signals to the video terminal V1 supplementing the coupled television scene display. Specifically, the video terminal V1 presents a viewer with a composite display of a scene at the location L1 along with graphic data. For example, assuming the location L1 is a bank branch office, the display by the terminal V1 could be somewhat as represented in FIG. 4. In that regard, the display has been simplified for purposes of explanation, particularly with regard to the room interior.

FIG. 4 shows the screen 60 of the terminal V1 depicting the scene inside the bank at the location L1. In the foreground, a group of people 62 are indicated to be standing in line at a teller window 64. Other people 66 are indicated to be standing near an entry door 68. As shown, note that in the scene, the graphics also indicate the door is located on 3rd Street. It should be noted a graphical cursor 71 indicating N/S/E/W is displayed. A considerable amount of graphic information supplements the scene display as indicated, specifically in the form of control status data 70 and location identification data 72.

Generally, the elements of the graphic data are self-evident. However, the first line of the identification data 72 indicates a telephone number for the scrutiny location, the next several lines indicate the name of the facility at the location L1, the address, and key personnel. Finally, the last line of the identification data 72 indicates a telephone number for the police station serving the location L1.

Typically, upon the initiation of communication between one of the display terminals V1–Vn and one of the scrutiny locations L1–Ln, the identification data 72 is presented and remains displayed without change. However, the control status data 70 (lower left) may be varied, depending on specific operating conditions as will now be considered.

As illustrated in FIG. 4, the control status data reveals an "alert" status (situation "yellow"), the scene being presented by camera C1 and the outgoing audio (central unit CU to location L1) being "on". Typically, the outgoing audio would not be active on initial contact. However, the initial conditions would be established and programmed depending on location, schedule, etc., the program being provided by the memory 48 (FIG. 3). However, after connection, the conditions may be varied to accommodate different situations as perceived either at the terminal V1 in the central unit CU, or at the location L1. For example, a manager at the desk 20 (FIG. 2) may use the telephone instrument 21 to command a change. In a similar way, changes can be commanded from the terminal V1 as will now be considered in detail.

Figure 5:
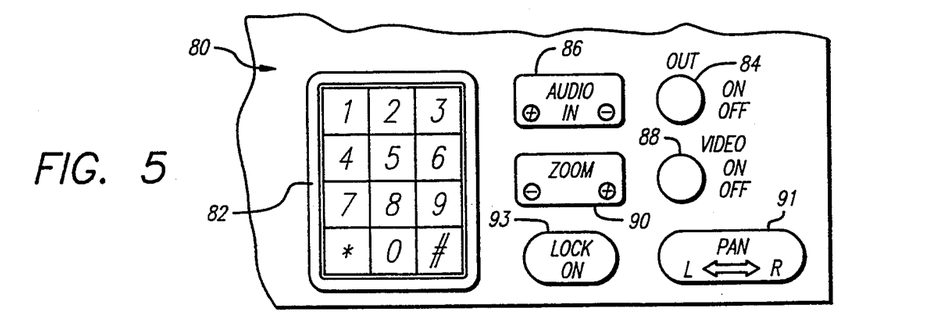
FIG. 5 is a graphic representation of a portion of the control panel of an element in the system of FIG. 3.

Recapitulating, the terminal V1 (FIG. 3) has been described to be in communication with the location L1 to provide a display as illustrated in FIG. 4. In addition to the display, the terminals V1-Vn incorporate a substantial control panel that my be embodied as a personal computer keyboard. Specifically, the control panel for each terminal V1-Vn includes all the current controls for a videophone, plus dedicated controls relating to the disclosed system. In that regard, in the interest of avoiding undue complications, only a fragment of the representative panel for the terminal V1 is shown in FIG. 5. Note that one panel could be used or could share multiple displays.

Specifically, the fragment of the panel 80 of FIG. 5 incorporates a traditional twelve-button telephone pad 82 bearing the numerals "1" through "0" along with the symbols "*" and "#" for generating DTMF signals in accordance with standard convention. Additionally, various specific controls are provided. An on-off button 84 controls outgoing audio. A toggle 86 controls the volume of incoming audio. An on-off switch 88 controls outgoing video. A pair of toggle switches 90 and 91 respectively control zooming and panning camera operations. Finally, a push button switch 93 serves to halt a sequence of displays locking onto the current display.

Recognizing that communications to the terminal V1 can be variously initiated, the control panel enable various commands. Again, recognize that communication may be established in a program sequence or originated at either the central unit CU or a remote location L1-Ln. Generally, by using the telephone keypad 82 on the panel 80, various functions can be accomplished as indicated by the following chart.

| CHART 2 | | |
|---|---|---|
| Command | Name | Operation |
| 30 | Status | Designates a status command is to follow |
| 31 | Routine | Sets "routine" status |
| 32 | Alert | Sets "alert" status |
| 33 | Emergency | Sets "emergency" status |
| 40 | Camera | Designates a camera command is to follow |
| 41 | Camera C1 | Sets camera C1 active |
| 42 | Camera C2 | Sets camera C2 active |
| 43 | Camera C3 | Sets camera C3 active |
| . | | |
| 50 | Synthesized Voice | Designates a synthesized voice command is to follow |
| 51 | Observed | Actuate voice generator to announce: "You are being observed . . . " |
| 52 | Recorded | Actuates voice generator to announce: "You are being recorded . . . " |

| -continued | | |
|---|---|---|
| CHART 2 | | |
| Command | Name | Operation |
| . | | |
| # | Execute | Execute entered command |
| * | Clear | Clear any entered or partially entered command |
| 11* | All Clear | Clear to receive operating commands |

To consider some examples, if the observer of the screen 60 perceives that the situation has become dangerous, touching the keypad buttons for "3" and "0" followed by the buttons designated "3" and "3" will change the represented status to situation "red" (R), i.e., "emergency". Note that as indicated in the display (FIG. 4), the status situations are indicated as a part of the status data. Also, the status data may be presented in three different colors, e.g. red, yellow and green, to indicate the situation somewhat more emphatically.

To consider another circumstance, in viewing a display on the screen 60 (FIG. 4), the observer at the terminal V1 (FIG. 3) may wish to concentrate on a specific one of the teller windows T1-T4 as represented in FIG. 2. For example, it may be desirable to actuate the display of camera C3 (FIG. 2, upper right) directed at the teller window T1. Accordingly, the keypad 82 is actuated first by touching buttons or keys "4" and "0" followed by the numerals "4" and "3" to actuate the camera C3. As a result, the display of the screen 60 is shifted to a view of the teller window T1.

To consider still another control operation, observation of the display on the screen 60 (FIG. 4) may suggest that some audio communication may be desirable from the video terminal V1 to the bank location L1. Initially, the audio "on-off" button 84 (FIG. 5) would be actuated to initiate audio communication. In that regard, note that audio communication from the bank to the video terminal V1, i.e., audio "in" is always active.

After actuating the outgoing audio to the bank location L1 (FIG. 1), the operator at the terminal V1 may elect between speaking an audio message or selecting a prerecorded audio message from memory and utilizing a voice generator as will be explained in greater detail below. In that regard, some situations may be particularly tense and a desirable procedure would involve simply indicating to those present in the bank location L1 that the entire is under surveillance and a video record is being produced. A record carrying the message in a powerful and confident voice may be the prudent course of action. Under such circumstances, as indicated in the above chart of commands, the operator may simply touch the buttons "5", "0" to command a synthesized voice message, then touch a specific command for a particular message. For example, the buttons of "5" and "1" command the vocalization of a message "You are being observed . . . ".

Note that after each command is issued, the operator must touch the numeral or pound symbol ("#") button to execute a command. To clear any entered or partially entered command, without execution, the operator simply touches the asterisk ("*") button. Finally, clearing the operating commands totally involves touching the code: "1, 1, *".

With the system in a cleared state, any of a variety of operational commands may be given, for example, a partial list of such commands is:

| CHART 3 | | |
|---|---|---|
| Command | Name | Operation |
| 20 | Op. Comm. | Operational commands to follow |
| 21 | Pre. Seq. | Revert to sequencing a predetermined program of locations |
| 22 | Rand. Seq. | Revert to sequencing a random program of locations |
| 23 | Set Call | Dial up a select location as identified by a four-digit number to follow |
| 24 | Police | Actuate police connection |
| . | . | . |
| . | . | . |
| . | . | . |

As one example, touching the keypad 82 (FIG. 5) to enter "2" and "0" indicates an operational command follows. Thereafter, entering "2" and "1" prompts the system to revert to a sequencing operation as described above in accordance with a predetermined program scheduling communication and monitor displays of individual remote locations. Alternatively, entering the numerals "2" and "2" initiates another form of sequencing in which the control computer provides a random program (within limits) to randomly observe or monitor remote locations. Note that dwell time may vary for individual locations L1-Ln.

As other operating examples, entering the numerals "2" and "3" indicates that the operator will next enter a four-digit number designating a particular remote location thereby providing a memory location address from which a telephone number for the location will be fetched and employed to actuate an automatic dialer as described below. Finally, as another example, indicated in the above chart, actuating the keypad 82 (FIG. 5) to enter the numerals "2" and "4" establishes connection with the police facility 14 (FIG. 1) thereby bringing such a facility into communication with the system in various arrangements.

Figure 6:
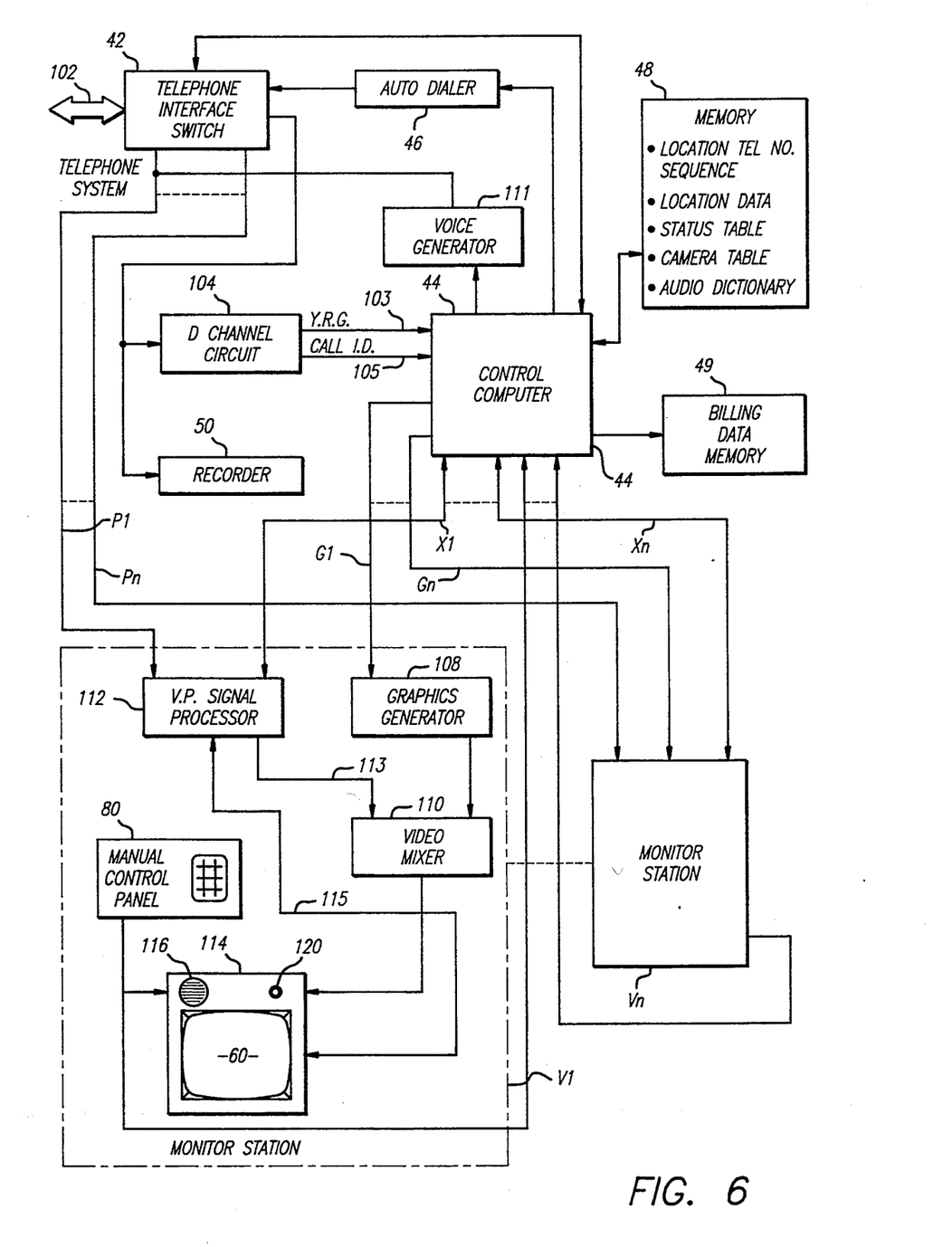
FIG. 6 is a somewhat detailed block diagram of the central station portion of the disclosed system in accordance with the present invention.

From the above descriptions, it is apparent that the disclosed system utilizes videophone technology in combination with other telephone system technology along with computer control and graphics technology to accomplish effective security monitoring and, to some extent, active involvement. To explain the system in greater detail, the structural components now will be considered. First, the central unit CU is treated with reference to FIG. 6. As mentioned above, elements previously described bear similar reference numerals. Accordingly, a plurality of individual monitor work stations V1–Vn for involved security monitoring are represented at the bottom of FIG. 6. Only the terminal V1 is shown in any detail. As indicated above, these terminals V1–Vn are collectively served by the other apparatus of the central unit as illustrated in FIG. 6.

To accomplish a complete understanding, the explanation of the central unit of FIG. 6 now may best be pursued by assuming certain circumstances and proceeding to describe the attendant operation concurrently with the introduction of any fresh components. Accordingly, inbound calling operations initially will be treated followed by a comprehensive treatment of outbound calling procedures.

Initially, as described above, inbound calls are received through the telephonic interconnection 102 (FIG. 6, upper left) accommodated by the interface telephone switch 42 as well known in the art. The information signals accompanying calls (ANI and DNIS) are passed to a D-channel circuit 104 as for decoding. That is, as indicated above, the calling number signals (ANI) identify the calling remote location. The called number signals (DNIS) indicate the state or situation prompting the call, e.g., situation "green", "yellow" or "red" respectively indicating "routine", "alert" and "emergency" situations.

Information carried by the ANI and DNIS signals is supplied from the circuit 104 to the memory 48 through the control computer 44. Specifically, a line 103 carries the situation information (DNIS-YRG) while a line 105 carries the call identification (ANI-Caller I.D.). Consider the ANI processing initially.

From the control computer 44, the representative ANI signals address the memory 48 to fetch detailed graphic information, specifically the identification data 72 as illustrated in FIG. 4. A signal represented form of such data is supplied from the control computer 44 through one of a series of graphic lines G1–Gn to a selected one of the monitor stations V1–Vn. Application to the station V1 will be assumed in pursuing the explanation, however, details of such selection are treated below.

Within the station V1, the graphic identification signal data on a caller is received by a graphics generator 108 for processing into a video signal that is supplied to a video mixer 110. The output from the video mixer 110 drives a monitor 114 to provide a scene-graphics display.

As a concurrent operation with the ANI signal processing, the DNIS signal representation (YRG) also is applied by the control computer 44 to the memory 48 for fetching an indication of the location status. Signal representations of the status also are supplied from the computer 44 to the graphics generator 108 and produce a situation representation (see status data 70, FIG. 4). Thus, the video mixer 110 receives comprehensive graphic signals for display concurrent with the picture scene representation, the signal source of which will now be considered.

With the completed connection from the remote location (FIG. 1), the specific incoming line is coupled to the monitor station V1 as assumed above. Specifically, the videophone signals are received by a videophone signal processor 112 (FIG. 6) for driving the video monitor 114 incorporating the display screen 60. Specifically, the signal processor 112 is coupled to the video mixer 110 to provide the scene content of the display.

The videophone signal processor 112 incorporates a video CODEC along with computing capability and may take the form of an AVP1000 video CODEC chip set as available from AT&T. Essentially, the CODEC chip set accomplishes videophone operation and consists of a video encoder, a video decoder and an internal system controller. As known, the system controller provides and receives: video data, audio data and data signals. In that regard, the videophone processor 112 is illustrated with cable (multiple path) connections. That is, path or line P1 is one of a series of lines P1–Pn carrying an encoded videophone signal between the switch 42 and the processor 112. A line 113 then carries received video data to the video mixer. A line 115 (bus or cable) carries several other signals, specifically, transmitted and received audio, transmitted video and data signals. The videophone processor 112 also is connected to the control computer 44 for data signal flow.

In addition to the display screen 60, the monitor 114 incorporates a speakerphone 116 and a video camera 120. As indicated above, signals from the speakerphone 116 and the video camera 120 are selectively transmitted to the remote location through the line 115 and the processor 112 under manual control.

Recapitulating to some extent, on receipt of an incoming call, ANI and DNIS data is processed along with the subsequent encoded videophone signal for application to a select monitor station to provide the picture display (scene and graphics) as generally represented in FIG. 4. Upon such an occurrence, the manual control panel 80 (FIGS. 5 and 6) adjacent the monitor 114 may be utilized to accomplish a number of operations including: changing the status, selecting a particular camera and controlling the zooming or panning of the camera, actuating either audio or video manifestations at the bank location L1, effecting a police connection, and so on. Accordingly, any of a number of courses may be pursued under the control of a trained operator including supplements to the video record as in the form of comments. As indicated above, the operator can command a synthesized voice message at the location L1. Specifically, voice data is drawn from the memory 48 (audio dictionary), a message is formulated by the central computer using well known techniques of the art and provided to a voice generator 111. The audio output from the voice generator 111 is processed by a videophone processor 112 for transmission to the remote location L1, and may pass through the processor 112 or, as illustrated, by processed at the telephone interface switch 102.

In the operation of the system embracing the exemplary formats as treated above and below, a record is made for billing purposes. That is, a billing data memory 49 (upper left, FIG. 6) is controlled by the computer 44, recording all transactions in relation to billing charges. Such data can be variously processed at different times.

To this point, consideration has been primarily directed to the treatment of incoming calls. Alternative modes involve the placement of outgoing calls under manual control and the automatic operation to provide a sequential display from remote locations L1-Ln. Such operations next are treated in detail.

Consider first the functions of the system when an operator manually initiates a call from the monitor station V1 to one of the remote scrutiny locations, e.g., location L1. Specifically, assume the need to establish a connection from the monitor station V1 to the remote bank location L1 initiated by an operator at the monitor station V1. Under such circumstances, the operator actuates the manual panel 80 (FIGS. 5 and 6) using selected commands (chart above) as will now be considered.

At the outset, a command "11*" clears the monitor station for manual control. Next, a command "20" indicates that operating commands are to follow. The operator next touches "23" to indicate that a specific remote location number will follow. Continuing, the operator touches the four-digit address signal for the location L1 in the memory 48. As a result, the control computer 44 (FIG. 6) addresses the memory 48 to fetch the telephone number for the bank location L1. The telephone number is supplied from the memory 48 to the control computer 44 which actuates the auto dialer 46 to provide the dial-up signals on an off-hook line provided in the coupling 102 to the dial-up telephone system TS (FIG. 1). Typically, at the location L1 a dedicated line will accept the communication. As with all dial-up operations, certain conditions are predetermined. That is, a particular camera (and settings) is specified and a tentative status also is specified. Typically, unless the status is specified, the dial-up connection will provide a "routine" or "green" status indication and utilize a camera positioned to provide a wide-angle field of view. Of course, as indicated above, the operator can immediately modify the initial predetermined conditions utilizing the control commands as explained above. Thus, under manual control, the established communication may be preserved for a period or terminated after a quick check of the situation. Manual control continues until the system again is set into an automatic sequence mode.

For most operating systems, it is likely that manual operation will not dominate the system. Rather, during much of the time, the monitor stations will collectively be programmed to automatically provide a sequential display of the remote locations L1-Ln. Thus, at the termination of an interval of one-to-one operation, a command will be given to resume sharing in the sequence monitoring. Specifically, as indicated above, a command of "21" will actuate the system to the predetermined program of locations or alternatively, a command "22" will actuate a random sequence operation.

During the sequential operation, the control computer 44 (FIG. 6) fetches telephone numbers for the remote locations L1-Ln from the memory 48 in a sequence, actuates the auto dialer 46 accordingly, and assigns the resulting connections to one of the monitor stations V1-Vn. After a short interval of operation, e.g. 30 seconds, the control computer 44 terminates the display connection to a station V1-Vn in favor of another waiting connection. The operation results in a sequential display at each of the monitor stations V1-Vn.

Figure 7:
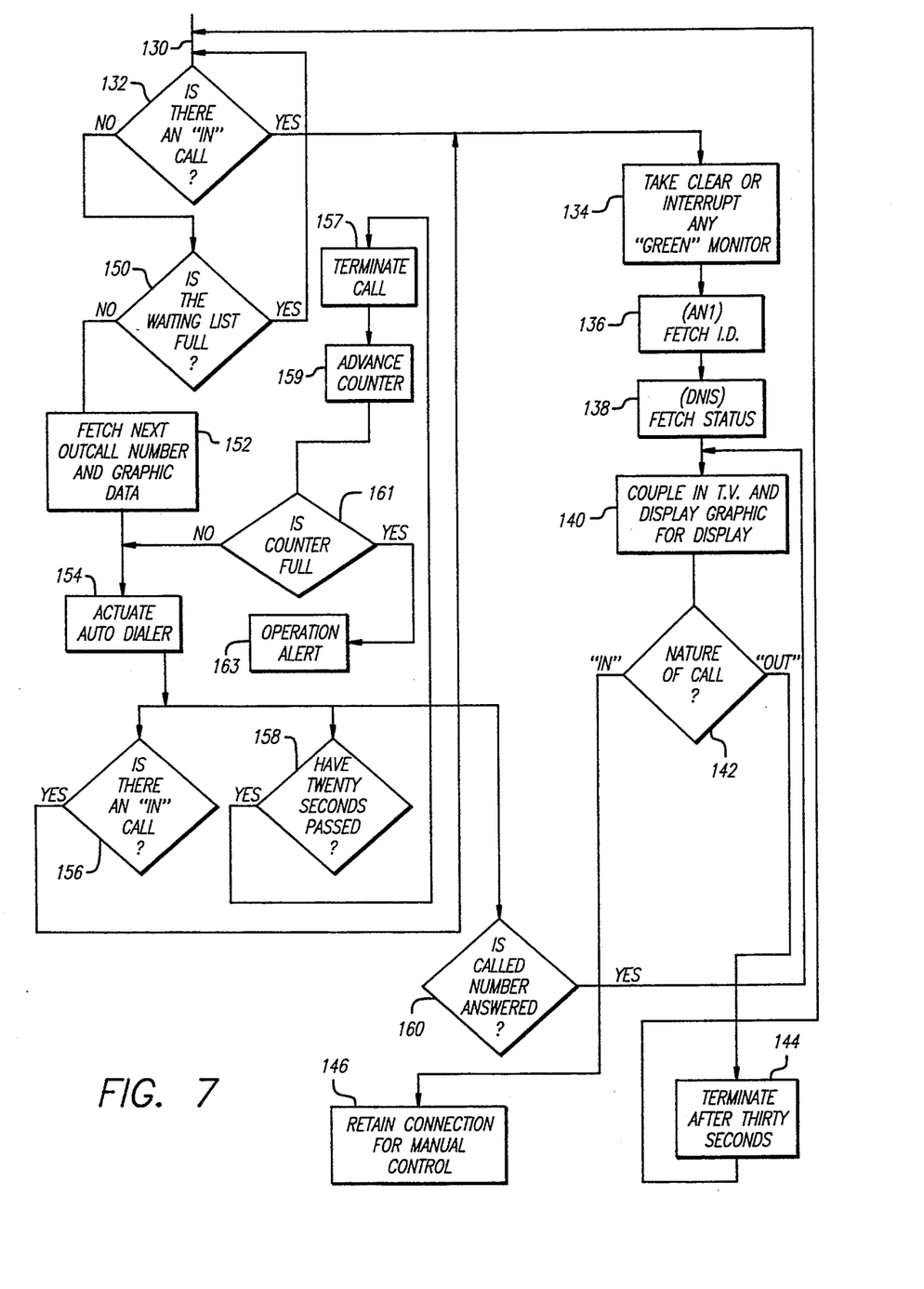
FIG. 7 is a logic diagram illustrating the operation program of the system of FIG. 6.

A logic program indicating the control operations of the control computer 44 will now be treated with reference to FIG. 7. The program is entered at a line 130 (upper left) shown leading to a decision or query block 132. The query posed by the query block 132 relates to whether or not there is an "incoming" call. In that regard, in the sequence dial-up system, the logic preserves a readiness for receiving incoming calls. Should there be such a call, prompting a "yes" path from the block 132, the process will proceed to a block 134 and pursue a path accommodating the incoming call. Specifically, from the block 134, if no monitor is available, a monitor displaying a "green" display would in interrupted. As indicated by a block 136, the "ANI" data from the incoming call would be employed to fetch the calling station identification and as indicated by the block 138, the DNIS data is similarly fetched. With the identification and status data at hand, the operation proceeds as represented by block 140 to display the composite scene and graphic data as depicted in FIG. 4.

Another input of the block 140 introduces a query as posed by a block 142 regarding the nature of the call, i.e., "incoming" or "outgoing". If the call was an outgoing, as indicated by the block 142, it is automatically terminated after 30 seconds. Alternatively, if the call is "incoming" the operation is yielded to manual control as indicated by the block 146.

Returning now to the block 132 (FIG. 4, upper left), the circumstance of "no" "incoming" call advances the program to a query block 150 directed to the state of the current waiting list of lines with established contact to a remote location. If the waiting list is full, or has attained a predetermined limit, a "yes" is prompted. The operation then returns to the entry point of the line 130 to cycle the query posed by the block 132.

Following the alternative "no" path from the block 150 indicating the waiting list is not full advances the program to a block 152. The operation is to fetch the next "out" call telephone number and the related data for the graphics display. As indicated above, in one embodiment, the data is simply addressed in the memory 48 (FIG. 6) by a four-digit number uniquely designating each remote location.

With the available telephone number, the auto dialer 46 is actuated as indicated by the block 154 (FIG. 7) during the interval while the graphics data is prepared for display. Exiting from the block 154, three parallel, somewhat simultaneous queries, are presented by blocks 156, 158 and 160. A "yes" response to any of the three queries prompts a fresh course of action as will now be considered.

The query block 156 poses the query of an "incoming" call. If such a call occurs, the operation is terminated in favor of receiving that call. Thus, the system reverts to block 134.

The query block 158 poses the query of time, i.e., have 20 seconds passed on the clock (not shown) in the control computer 44, FIG. 6. If that interval does pass prior to the time when the called telephone is "answered" (goes "off-hook"), some difficulty is presumed. Under the circumstance, the system makes additional attempts to attain a connection. If unsuccessful, other action is signalled, as by manual intervention.

Pursuing the course of FIG. 7, the calling connection is terminated (block 157), a counter is advanced ((block 159) and unless the counter is at capacity (query block 161) with some delay, the call is again placed. After a predetermined number of efforts, e.g., three, the counter is filled to prompt an "operator alert" (block 163). As a result, with manual intervention, other action is taken. For example, alternate telephone numbers may be tried.

Next, assume that the outgoing call is answered. As indicated by the block 160, the operation proceeds to the block 140 to accomplish the operations attendant accomplishing the display.

The operation of the block 140 was considered above in relation to "incoming" calls. However, in the instant situation, involving an "outgoing" call, the operation proceeds to the block 144 to terminate the connection and the attendant display after 30 seconds. As indicated above, the display is given to an available one of the monitor stations V1–Vn from the waiting list somewhat as collectively represented by the block 140.

Thus, the system accomplishes a sequence of displays representative of the remote locations L1–Ln. As indicated above, a single monitor station may be employed; however, in the disclosed embodiment, several monitor stations V1–Vn share the sequence accommodating interruption either for manually controlled "outgoing" calls or "incoming" calls.

Recapitulating, the above description has treated automatically actuated incoming calls, manually-actuated incoming calls, automatically sequenced outgoing calls and manually-actuated outgoing calls, all with respect to the central unit CU. Details of the central unit CU have been treated and now a detailed exemplary structure for a remote location will be considered. Accordingly, reference will now be made to FIG. 8.

Figure 8:
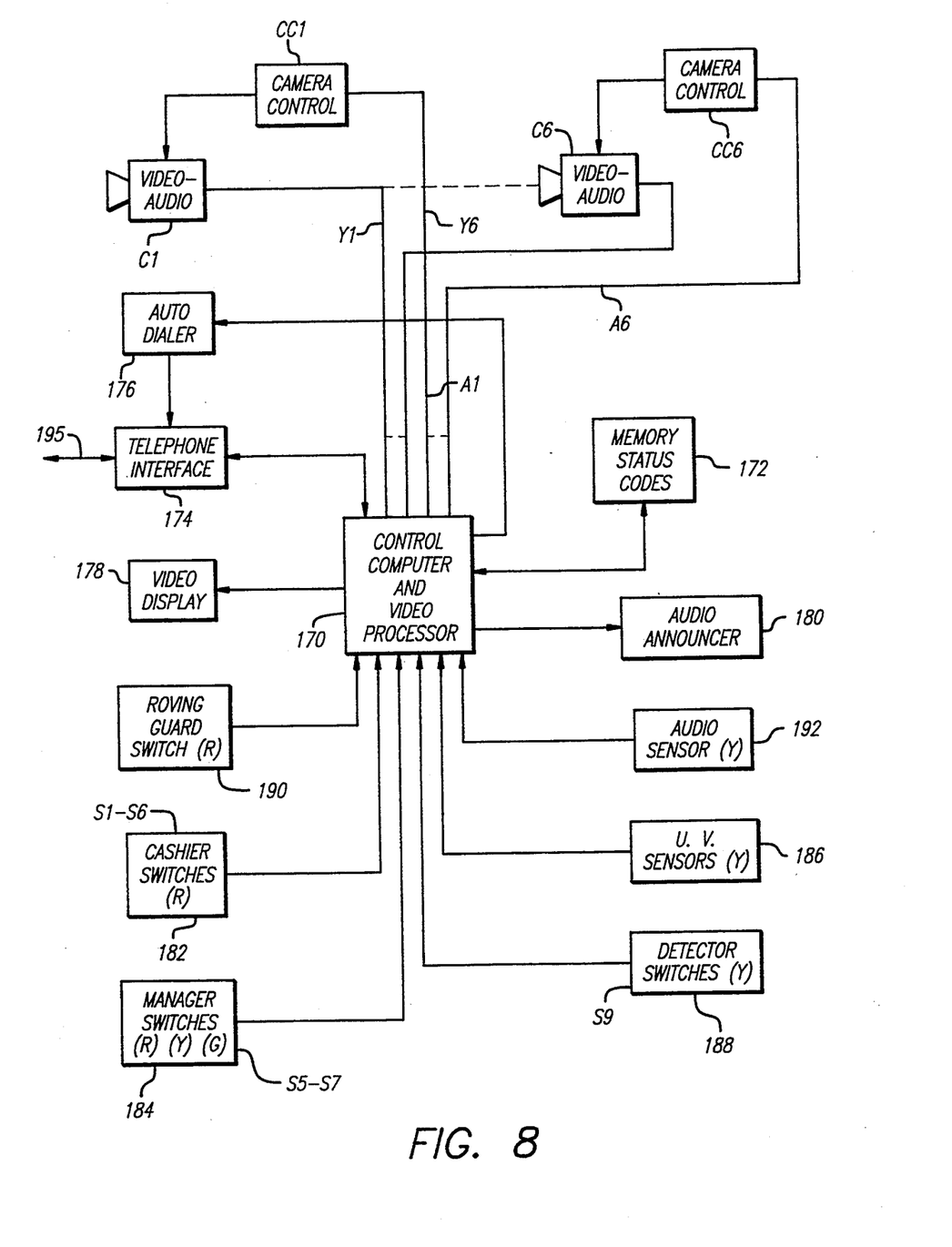
FIG. 8 is a detailed block diagram of a portion of the disclosed system in accordance with the present invention at a remote location.

The videophone cameras C1–C6 are indicated at the top of FIG. 8 connected to a control computer and videophone processor 170 which may involve a relatively simple control to coordinate switches and sensors with respect to a memory 172, a telephone switch or interface 174 and an auto dialer 176. Apart from the control function, the processor 170 incorporates the videophone processing, e.g., a video-CODEC chip set as mentioned above. As indicated, such structures are readily available for videophone operation. In conjunction with such structure, the computer 170 drives a video display 178 and an audio speaker or announcer 180.

The control and processor 170 is additionally connected to a series of sensors and switches as indicated above. Correlating the structure to FIG. 2, the switches S1–S1 are represented by a single block designated 182. The manager switches S5–S7 are represented by a block 184. The infrared sensor or switch S8 is represented by a block 186 and the doorway detector or switch S9 is represented by a block 188. Additionally, a roving guard switch is represented by a block 190 and an audio sensor or threshold microphone is designated by a block 192. The situation status prompted by the switches can be seen in FIG. 8, i.e., RGY.

Generally, with regard to control, the processor 170 has a dual function of responding to "incoming" calls and responding to switches to place "outgoing" calls. Note that with respect to the processor 170, the designations "incoming" and "outgoing" calls are reversed from the terminology as used above with respect to the central unit CU.

Upon the occurrence of an incoming call from the telephone system TS through a cable 195, the telephone interface unit 174 establishes a connection through the processor 170 to the video display 178 and prompts the processor 170 to respond to processor control signals. More specifically, an incoming call prompts the control processor 170 to fetch a set of standard conditions from a look-up table embodied in the memory 172 to thereby establish settings for the videophone cameras C1–C6 and activate the video display 178 and the audio announcer 180. One of the cameras, typically camera C1, also will be selected. Accordingly, in response to the received call, the processor 170 provides an output from the camera C1 (set with a wide field of vision) through the telephone interface 174 to be carried as a videophone signal embodying both video and audio data. Additionally, the video display 178 and the audio announcer are activated for response to any received audio or video data.

As indicated above, various signals may be communicated from the central unit CU through the telephone interface 174 to the control processor 170 for varying the settings of the cameras C1–C6. Thus, both control and videophone signals are communicated between the cameras C1–C6 and the processor 170. The videophone signals are provided through a series of lines X1–X6. The control signals pass in the other direction through lines A1–A6 and camera control units CC1–CC6, respectively. Essentially, the control units CC1 and CC6 activate the cameras C1–C6 for panning and field-of-vision changes. In that regard, the processor 170 simply decodes data signals originated at the central unit CU to actuate the control units CC1–CC6. Thus, once communication is established, the location apparatus of FIG. 8 simply responds to commands and any audio or video supplied. To initiate a communication the apparatus operates in a manner similar to the central unit CU.

With respect to outgoing calls, the processor 170 responds to various of the sensors or switches as embodied in the blocks 182, 184, 186, 188, 190 and 192. The sensor or switch of each of the blocks is associated with a look-up table embodied in the memory 172 storing a telephone number for designating the status and a calling line for designating the location. That is, as explained in detail above, DNIS signals are interpreted at the central unit to indicate a particular status while ANI signals are employed to indicate the location of the calling facility. An exemplary sequence will illustrate the operation.

Assume for example that a person enters the bank facility at location L1 (FIG. 2) carrying a weapon. Further assume that the door sensor 59 embodied in the detector 188 (FIG. 8) senses the presence of a sizeable metallic object and provides a signal to the control processor 170. Based on the source of the signal, the control computer addresses the memory 172 to fetch the telephone number for the central unit CU established to indicate a "caution" or "yellow" situation. That telephone number is retrieved. Accordingly, the telephone interface 174 goes "off-hook" and the auto dialer 176 is actuated to dial the fetched telephone number. Consequently, the telephone interface 174 is coupled for communication through the cable 195 and the dial-up telephone facility with the central unit CU. The ANI and DNIS signals provided, the camera C1 provides audiovisual data for a videophone signal supplied from the control processor 170 and the telephone interface 174 to the active line. Accordingly, the desired display is accomplished as explained above, also affording various selected control operations as indicated above.

To consider an exemplary control operation, assume for example that the operator at the central unit CU perceived a particular problem at the teller window T1 (FIG. 2). As a consequence, an operation command would be entered as described above switching the source of the videophone signal from the camera C1 to the camera C3. Also, command operating signals could be provided to pan or vary the field of vision provided by the camera.

As will be apparent from the above, systems of the present invention may be variously implemented to accommodate a multitude of different facilities and needs. Also, the system may be configured to accommodate specialists at the videophone terminals V1–Vn (FIGS. 1, 3 or 6). For example, certain of the terminals V1–Vn might be attended by specialists in identified emergencies, e.g., situation "red" or "emergency" calls. Other terminals might be attended by specialists in "alert" or "yellow" situations, e.g., a suspicious man standing in a doorway, etc. Pursuing the considerations, still other of the terminals V1–Vn could be monitored by specialists in the standard or routine monitoring, e.g., ten or twenty seconds per location.

To accommodate the dedication of certain terminals V1–Vn to specialists, the switch 102 (FIG. 6) is controlled by the control computer to transfer connected remote locations L1–Ln from one of the terminals V1–Vn to another. In some instances, it also may be desirable to couple a location to several of the terminals.

In view of the above description, it will be apparent that numerous operating formats, programs and layouts may be accomplished using a wide variety of videophone equipment in cooperation with computing and sensor apparatus. As indicated above, the disclosed embodiment affords one arrangement; however, the scope hereof should not so confined, rather the scope hereof should be in accordance with the claims as set forth below.

What is claimed is:

1. A system for monitoring a plurality of scrutiny locations from a central station using dial-up telephone facilities comprising:

television camera structures at said plurality of scrutiny locations for providing representative dynamic image television signals representative of scenes;

at least one television display structure at said central station;

telephonic interface apparatus for interconnecting said television structures at said scrutiny locations to said central location; and a control unit at said central station including memory for storing scrutiny location call data and graphic display data, said control unit for actuating said telephonic interface apparatus to establish television communication between said central station and said scrutiny locations to provide a sequence of remote location displays at said central station showing a scene and graphic display data, said control unit further including interrupt structure for receiving an interrupt signal manifesting a predetermined circumstance to interrupt said sequence and to provide an alternate display of a scene from one of said scrutiny locations along with graphic display data, further including sensor units at said scrutiny locations for providing said interrupt signal to said control unit, wherein said sensor units are priority coded to provide interrupt signals of different priorities and wherein said central unit provides displays in accordance with said priorities.

2. A system according to claim 1 wherein said sensor units include a manual switch device.

3. A system according to claim 1 wherein said sensor units include an infrared device.

4. A system according to claim 1 wherein said sensor units include a metal detector device.

5. A system according to claim 1 wherein said telephonic interface includes means for providing "D" channel type signals, as ANI and DNIS signals to manifest said interrupt signals.

6. A system according to claim 1 wherein said control unit includes means for providing graphic displays on said remote location displays.

7. A system according to claim 1 further including operator control structure at said central station to provide said interrupt signal.

8. A system according to claim 1 wherein said television camera structures for at least one of said plurality of security locations includes a processor for interfacing said control unit at said central station to control said television communication between said central station and said one scrutiny location.

9. A system according to claim 8 wherein said television camera structure for said one scrutiny location includes a plurality of sensor units at said scrutiny locations for providing interrupt signals to said control unit.

10. A system for monitoring a plurality of scrutiny locations from a central station utilizing dial-up telephone facilities comprising:

a plurality of television camera structures with control structure at said plurality of scrutiny locations for providing representative image television signals and for receiving control signals;

a plurality of switch structures for at least one of said scrutiny locations for providing alert signals;

a memory apparatus at said one scrutiny location for storing line designations addressable by said alert signals to provide line designation signals;

at least one television display structure at said central station for providing a display from image television signals;

at least one telephonic keypad structure at said central station for providing control signals and being associatively coupled to said television display structure;

telephonic interface apparatus for interconnecting said television structures at said scrutiny locations and said central location for two-way communications; and a control computer at said one scrutiny location coupled to said memory apparatus and said telephonic interface apparatus for actuating said telephonic interface apparatus in accordance with said line designation signals to selectively communicate with one of said television display structures and to control said television display structures in accordance with said control signals from a keypad structure.

11. A system according to claim 10 further including a memory coupled to a control unit at said central station, and said control unit further including means to address said memory to further control said telephonic interface.

12. A system according to claim 10 further including a memory coupled to a control unit at said central station, and said control unit further including means to address said memory to provide data for supplementing said dynamic image signals for various graphic displays.

13. A system according to claim 10 further including a control unit and memory at said central station, and said control unit further including means to address said memory to provide control signals for said television camera structure at said scrutiny locations.

14. A system according to claim 10 further including a control unit and memory at said central station, and said control unit further including means to address said memory to provide an initial operating sequence of graphic displays from a television camera structure to a select television display structure.

15. A system according to claim 10 further including a control unit and memory at said central station, and said control unit further including means to address said memory to formulate a record for billing purposes.

16. A system according to claim 10 wherein said telephonic interface apparatus receives "D" channel type signals and said control computer includes means responsive to said "D" channel type signals.

17. A system according to claim 16 further including a memory coupled to a control unit at said central station, and said control unit further including means to address said memory to further control said telephonic interface in accordance with said "D" channel type signals.

18. A system according to claim 17 wherein said control unit supplements said dynamic image signals for various graphic displays.

19. A system according to claim 17 wherein said control unit controls said television camera structures at said scrutiny locations.

20. A system according to claim 19 further including a control unit and memory at said central station, and said control unit further including means to address said memory to further control said telephonic interface.

21. A system according to claim 17 wherein said control unit provides an initial operating sequence of graphic displays.

22. A system according to claim 21 wherein said telephonic interface apparatus receives "D" channel type signals and said control unit includes means responsive to said "D" channel signals.

* * * * *

Disclaimer

5,412,708 — Ronald A. Katz, Los Angeles, CA (US). VIDEOPHONE SYSTEM FOR SCRUTINY MONITORING WITH COMPUTER CONTROL. Patent dated May 2, 1995. Disclaimer filed January 28, 2016, by the assignee, Telebuyer, LLC.

Hereby disclaim complete claims 1-22 of said patent.

*(Official Gazette, April 5, 2016)*